United States Patent
Story

(10) Patent No.: US 6,571,265 B1
(45) Date of Patent: May 27, 2003

(54) MECHANISM TO DETECT IEEE UNDERFLOW EXCEPTIONS ON SPECULATIVE FLOATING-POINT OPERATIONS

(75) Inventor: Shane Story, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/430,243

(22) Filed: Oct. 29, 1999

(51) Int. Cl.[7] .............................................. G06F 9/302
(52) U.S. Cl. ........................ 708/498; 708/525; 712/222; 712/244
(58) Field of Search ................................ 708/498, 525; 712/222, 244

(56) References Cited

U.S. PATENT DOCUMENTS

| | | | |
|---|---|---|---|
| 4,961,161 A | * 10/1990 | Kojima ........................ 708/525 |
| 5,410,657 A | 4/1995 | Olson et al. ................. 712/215 |
| 5,546,551 A | 8/1996 | Kohn ........................ 707/102 |
| 5,673,426 A | * 9/1997 | Shen et al. .................. 712/244 |
| 5,805,918 A | 9/1998 | Blomgren et al. ........... 712/143 |
| 5,812,439 A | 9/1998 | Hansen ........................ 708/497 |
| 5,826,070 A | * 10/1998 | Olson et al. ................. 712/222 |
| 6,044,454 A | * 3/2000 | Schwarz et al. ............. 712/201 |
| 6,058,470 A | 5/2000 | Webb et al. ............... 712/208 |
| 6,151,669 A | * 11/2000 | Huck et al. ................. 712/222 |
| 6,219,685 B1 | * 4/2001 | Story ........................ 708/498 |

FOREIGN PATENT DOCUMENTS

WO    US00/25490    9/2000

* cited by examiner

Primary Examiner—Kenneth S. Kim
(74) Attorney, Agent, or Firm—Blakely, Sokoloff, Taylor & Zafman LLP

(57) ABSTRACT

A mechanism is disclosed for detecting underflow conditions for speculative floating-point operations. A floating-point status register includes a status flag which is set when a result generated by a floating-point instruction is "tiny". The status flag is cleared, all exceptions are masked, and the instruction is executed speculatively. The "tiny" exception flag is read to determine whether the speculatively executed instruction should raise an unmasked underflow exception. The exception may be raised if the processor reaches a point of registration associated with the instruction. The exception may be ignored if this point is not reached.

21 Claims, 3 Drawing Sheets

MECHANISM TO DETECT IEEE UNDERFLOW EXCEPTIONS ON SPECULATIVE FLOATING-POINT OPERATIONS

BACKGROUND OF THE INVENTION

1. Technical Field

This invention relates to processors, and in particular to methods for detecting underflow during selected processor operations.

2. Background Art

High-performance processors are being designed to execute multiple instructions in parallel at clock frequencies in excess of one gigahertz. However, the instruction-executing capabilities of these processors have begun to outstrip the availability of instructions to execute due to the limited amount of instruction level parallelism (ILP) in any given section of program code. ILP refers to the availability of instructions that can be executed in parallel.

An instruction can be scheduled to execute in parallel, i.e. simultaneously, with a group of instructions if the instruction does not require a result generated by one of the instructions in the group, i.e. if the instruction does not depend on any of the other instructions. To increase ILP, some compilers locate non-dependent instructions within a specified scope of the code section being scheduled, and schedule these non-dependent instructions for simultaneous execution with instructions in the code section.

Branch instructions complicate instruction scheduling by introducing an element of indeterminacy into the sequence of instructions executed by a processor ("execution path"). A branch instruction sends the processor down one of two or more execution paths, depending on the resolution of an associated branch condition. An instruction on one of the execution paths that follow the branch instruction is said to be "guarded" by the branch instruction, since its execution status, i.e. whether or not it should have been executed, is determined by how the branch is resolved. Control speculation is the compiler optimization through which an instruction is rescheduled for execution before the branch that guards its execution. Executing the instruction prior to the branch that guards it is deemed speculative, because it is not known whether the instruction actually needs to be executed until the branch condition is subsequently resolved.

When an instruction is speculatively executed, certain events that the instruction may trigger should not be registered until the instruction's execution status is resolved. For example, a processor performs various checks on the result generated by each floating-point instruction to determine whether the result meets certain size or format standards. A result that does not meet these standards is deemed exceptional and can trigger a call to an "exception handler". The exceptions for floating-point operations are defined by the IEEE 754-1985 Standard for Binary Arithmetic Operations (IEEE 754). For example, an overflow (underflow) exception occurs when a numerical result is too large (small) to be represented in the format specified for the result.

The occurrence of an exception may be indicated by the state of a corresponding status flag that is set under control of the floating-point hardware that generates the result. When the exception is enabled (unmasked) and the corresponding status flag indicates the exception occurred, an exception handler is invoked to address the exception. If the exception is disabled (masked), the exception handler is not invoked even if the corresponding status flag indicates the exception occurred. Masking all exceptions for speculative instructions prevents a processor from expending resources on an instruction before its execution status is determined. If the speculatively executed instruction is not on the processor's execution path, any resource employed to handle an exception it raises are wasted.

One difficulty with speculatively executed floating-point instructions is that under IEEE 754 the underflow status flag is set under different conditions, depending on whether or not the underflow exception is masked. When the underflow exception is unmasked, the underflow status flag is set if a calculated number is smaller than the smallest number that can be represented in the format specified for the number, i.e. when the result is determined to be "tiny". If the underflow exception is masked, the underflow exception status flag is set if the result is both "tiny" and "inexact", i.e. it can not be expressed exactly. An instruction may thus generate different results, depending on whether it is executed normally, i.e. in its original order, or speculatively.

The present invention provides a mechanism for addressing these and other problems associated with exception handling for speculatively executed instructions.

SUMMARY OF THE INVENTION

The present invention provides a mechanism for detecting underflow conditions in speculatively executed floating-point instructions.

A method in accordance with the present invention masks an underflow exception for a floating-point instruction, and executes the instruction. If a result generated by the instruction is less than a specified minimum value, a status flag is set.

For one embodiment of the invention, the status flag is read if a point of registration associated with the instruction is reached and an unmasked underflow exception is raised if the status flag is set. For another embodiment of the invention, the status flag is a sticky bit in a floating-point status register, and the status flag is cleared by executing a clear flag(s) instruction.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DISCUSSION OF THE INVENTION

Figure 1:
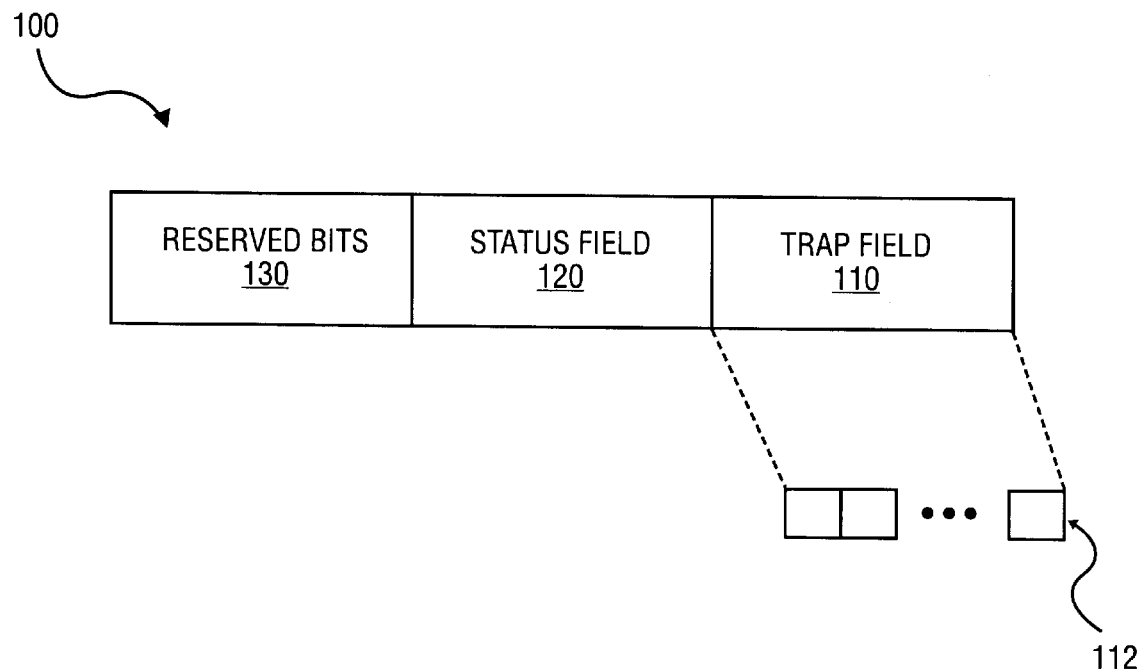
FIG. 1 is a block diagram of one embodiment of a floating-point status register that is suitable for use in the present invention.

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The present invention is illustrated with respect to IEEE 745, but the invention is not limited to this standard. Under IEEE 745, underflow is defined with respect to "tininess" and "inexactness", and a result is tested for "tininess" after it is rounded. The result is said to be "tiny" if the result, computed as though the exponent range were unbounded, would yield a non-zero value that lies strictly between $+2^{Exp(min)}$ and $-2^{Exp(min)}$. Here, Exp(min) is the smallest exponent in a given representation. It is often important to detect "tiny" results since they can lead to overflow if they operate as divisors in subsequent calculations. A result is deemed "inexact", under the same standard, when it differs from the result that would have been computed if both the exponent range and precision were unbounded.

Under IEEE 745, an underflow exception is raised under different circumstances depending on whether the underflow exception is masked (disabled) or unmasked (enabled). When the underflow exception trap is unmasked, an underflow exception is raised when the result of the operation is "tiny". When the underflow exception trap is masked, an underflow exception is raised only if the result of an arithmetic operation is both "tiny" and "inexact".

As noted above, this difference complicates the detection of underflow exceptions for speculatively executed floating-point instructions. These instructions are typically executed with all exceptions, including the underflow exception, masked. Masking the exceptions prevents the processor from committing resources to exception handling before the execution status of the "excepting" instruction has been resolved. If a speculatively executed instruction originates on an execution path that is bypassed by a branch, processing an exception raised by the speculatively executed instruction wastes processor resources.

Under these conditions, an underflow exception for a speculatively executed instruction is detected only if the result generated by the instruction is both "tiny" and "inexact". If the instruction is normally, i.e. non-speculatively, executed with the underflow exception unmasked, an underflow exception will be detected if the result generated by the instruction is "tiny", independent of whether it is "inexact". The potential for an instruction to produce different results when it is executed normally and speculatively undermines the advantages gained by speculation.

The present invention allows unmasked underflow exceptions to be detected even when the instruction is executed speculatively, i.e. when the underflow exception is masked. It does so by providing a status flag that may be set by the hardware when a floating-point instruction generates a "tiny" result. This status flag is in addition to an underflow exception status flag that is set/reset according to IEEE 745 and which may be masked. Setting the "tiny" status flag to a selected value, e.g. one, signals an unmasked underflow exception, independent of whether the underflow exception is masked or unmasked.

For one embodiment of the invention, the underflow exception is masked through an associated mask bit and the exception flags are initialized. Initialization may be done, for example, through an instruction that clears the IEEE status flags, provided the instruction is defined to clear the "tiny" status flag as well. A floating-point instruction may then be executed speculatively, and the exception status flags updated according to the result generated. The state of the "tiny" status flag is checked to determine whether the instruction generated an unmasked underflow exception. This may be done at a point in the control flow at which it has been determined that the speculatively executed instruction(s) lies on the execution path of the processor. For example, the processor may read the "tiny" flag and raise an underflow exception if necessary, when it reaches a point in the control flow at which the instruction is normally, i.e. non-speculatively, executed. More generally, the processor may raise the exception when it is clear the instruction will update the processor's architectural state, e.g. when the processor reaches a point of registration for the instruction.

FIG. 1 is a block diagram of one embodiment of a floating-point status register (FPSR) 100 that is suitable for implementing the present invention. FPSR 100 contains dynamic control and status information for floating-point operations. This information indicates, for example, which of several different modes will be used to determine the numerical result of a floating-point operation and whether to respond if the operation generates a particular exception.

The disclosed embodiment of FPSR 100 includes a trap field 110 and one or more status fields 120. Trap field 110 includes a series of mask bits 112, each of which may be set to mask (disable) a corresponding exception. When any of these exceptions are unmasked (enabled), e.g., when the corresponding mask bit is not set, the processor jumps to an exception handling routine if the exception is detected in the result of the arithmetic operation. When any of these mask bits is set, the exception handler is not invoked if the corresponding exception is detected in the result, e.g. if the corresponding exception flag is set.

Status field 120 specifies mode information and tracks result status information. The mode information is used to control the manner in which the arithmetic result is calculated. The status information indicates any exceptions that apply to the result. Multiple status fields 120 may be used to specify modes and track result status information for multiple operations or to specify different modes and track result status information for multiple instances of the same operation.

Figure 2:
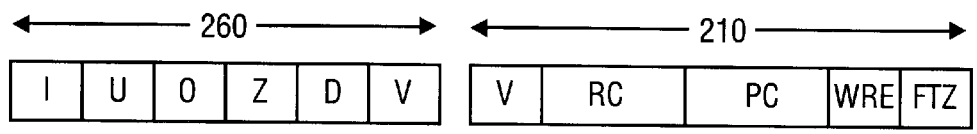
FIG. 2 is a block diagram of one embodiment of a status field in the floating-point status register of FIG. 1.

FIG. 2 is a block diagram of one embodiment of status field 120. The disclosed embodiment of status field 120 includes a control field 210 and a status field 260. Control field 210 includes a number of sub-fields for specifying the mode in which the operation is to be implemented. Flag field 260 includes a number of sub-fields, e.g. status flags, each of which may be set or reset according to a corresponding property of the result generated by the operation. For example, the status flags may be exception flags that are used to indicate whether various exceptions occurred in calculating a result. Tables 1, 2, and 3 summarize control sub-fields for one embodiment of control field 210. Table 4 summarizes status sub-fields for one embodiment of flag field 260.

TABLE 1

| Control Sub-Field | Description |
| --- | --- |
| Ftz | Flush to zero mode |
| Wre | Widest range exponent |
| Pc | Precision control |
| Rc | Rounding control |
| Td | traps disabled |

Here, Ftz mode causes results that encounter "tininess" to be truncated to a correctly signed zero value when bit 0 is set.

When bit 6 is set, Td mode prevents the processor from invoking an exception handler if flag sub-fields representing certain exceptions are detected in the result of an arithmetic operation. It provides an alternative mechanism for masking exceptions to mask bits 112 in trap field 110. Wre, Pc, and Rc operate in conjunction with an instruction completer to indicate how a floating-point operation is to be rounded. The instruction completer, wre, and pc specify the significand precision and exponent range of the result. If the result is "inexact", rc indicates how the result is rounded. The different modes for one embodiment of the invention are summarized in Tables 2 and 3.

TABLE 2

| Instruction Completer | pc | wre | Significand Precision | Exponent Range | Computation Style |
|---|---|---|---|---|---|
| Parallel FP | ignored | ignore | 24 bits | 8 bits | 2 PA-RISC SP |
| .s | ignore | 0 | 24 bits | 8 bits | 1 PA-RISC SP |
| .d | ignore | 0 | 53 bits | 11 bits | 1 PA-RISC DP |
| .s | ignore | 1 | 24 bits | 17 bits | full reg. file SP |
| .d | ignore | 1 | 53 bits | 17 bits | full reg. file DP |
| None | 00 | 0 | 24 bits | 15 bits | IA-32 stack SP |
| None | 01 | 0 | NA | NA | Reserved |
| None | 10 | 0 | 53 bits | 15 bits | IA-32 stack double |
| None | 11 | 0 | 64 bits | 15 bits | IA-32 double-extended |
| None | 00 | 1 | 24 bits | 17 bits | full reg. file SP |
| None | 01 | 1 | NA | NA | Reserved |
| None | 10 | 1 | 53 bits | 17 bits | full reg. file DP |
| None | 11 | 1 | 64 bits | 17 bits | full reg. file DE |
| NA | ignore | ignore | 64 bits | 17 bits | full reg. file DE |

In table 2, IA refers to elements of the Intel® Architecture, PA-RISC refers to elements of a Hewlett Packard Architecture, SP stands for single precision, DP stands for double precision, and DE stands for double-extended precision.

TABLE 3

| | Nearest (even) | −Infinity (down) | +Infinity (up) | Zero (truncate) |
|---|---|---|---|---|
| Rc | 00 | 01 | 10 | 11 |

Flag sub-fields 260 and descriptions for the disclosed embodiment of FPSR 100 are summarized in Table 4. For one embodiment of the invention, all status flags are sticky bits which must be set and cleared explicitly, e.g. through a clear instruction. Exception Status flags defined under IEEE 745 are labeled IEEE in parentheses. Logic in the floating-point execution unit that is used to implement floating-point operations detects the various conditions represented by the flags of sub-field 260 and sets the flags accordingly. For example, the floating-point logic sets the O sticky bit if the result generated by a floating-point operation is too large (according to IEEE 745) to be represented in the format specified for the result.

TABLE 4

| Flag Sub-Field | Description |
|---|---|
| V | Invalid operation (IEEE) |
| D | Denormal/unnormal operand |
| Z | Zero divide (IEEE) |
| O | Overflow (IEEE) |
| U | Underflow (IEEE) |
| I | Inexact (IEEE) |
| T | Tiny |

Here, D refers to a sticky bit that is set when an operand in an unnormalized format is consumed by an instruction. An operand is unnormalized when the most significant bit of the operand is zero in the specified data format. U is an IEEE sticky bit that is set when there is an underflow exception for the result of a floating-point operation. If the underflow exception is unmasked, e.g. the corresponding mask bit is not set, U is set when a floating-point operation generates a result that is smaller than the smallest number that can be represented using the available exponent bits, i.e. its "tiny". If the underflow exception is masked, e.g. the corresponding mask bit is set, U is set only if it the result is both "tiny" and "inexact". As noted above, the state of U depends on whether the underflow exception is masked or unmasked under IEEE 745. In the disclosed embodiment, this is indicated by the logic state of the associated mask bit.

T is a new status flag that has been defined to implement the present invention. For one embodiment of the invention, T is a sticky bit that is set when the result generated by an instruction is tiny. The state of sticky bit T is independent of the state of any mask bits in trap field 110 (or Td in control field 210). For the disclosed embodiment of the invention, it is set when a result is determined to be tiny, and it is cleared by a clear instruction. For one embodiment of the invention, a reserved bit in FPSR 100 may be assigned to T. While "tiny" is defined under IEEE 745, this standard does not define a separate "tiny" exception. Rather, it is subsumed in the underflow exception U under IEEE 745. For this reason, T is not labeled IEEE in Table 4.

Figure 3:
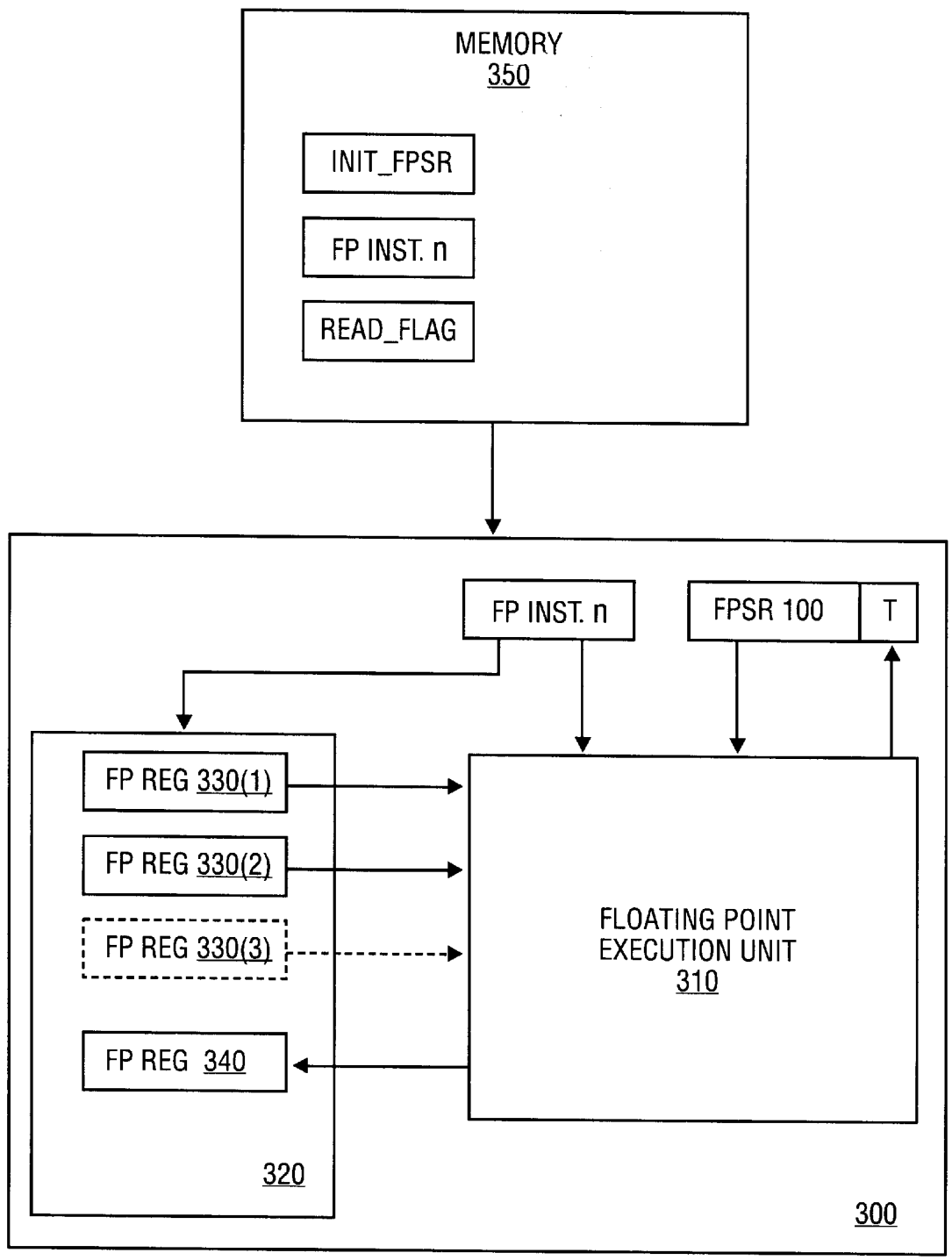
FIG. 3 is a block diagram of a computer system including a processor that implements an underflow reporting mechanism in accordance with the present invention.

FIG. 3 is a block level diagram representing a processor 300 that implements a floating-point operation in accordance with the present invention. Also shown is a memory 350 to provide instructions to processor 300 for execution. Processor 300 includes a floating-point execution unit 310 and a floating-point register file 320. Floating-point register file 320 includes registers 330(1)–330(n) (collectively, "registers 330") which provide source operands to execution unit 310 and receive result operands from execution unit 310 in response to a floating-point instruction (FP INST). FP INST operates in conjunction with FPSR 100 to control execution unit 310. FPSR includes a "tiny" exception flag T to track the "tininess" of any results generated by execution unit 310.

Execution unit 310 receives an indication of the operation to be performed and the mode in which it is to be performed from FR INST and FPSR 100. Register file 320 provides source operands to execution unit 310 from registers 330 indicated by FP INST. For the disclosed embodiment, floating-point operations may require from one to three source operands. Execution unit 310 provides the result of the indicated operation to a register 330 indicated by FP INST, e.g. register 330(n). Register 330(n) may be one of the source registers or it may be a distinct register. Execution unit 310 also updates FPSR 100, as necessary, according to the status of the result generated by the floating-point operation. For example, execution unit 310 may set one or more exception status flags in the status field of FPSR 100 if the result is exceptional according to one or more of the definitions under IEEE 745. For the present invention, execution unit 310 may set a "tiny" status flag, T, in FPSR 100 if the result meets the definition of "tiny" under IEEE 745.

Figure 4:
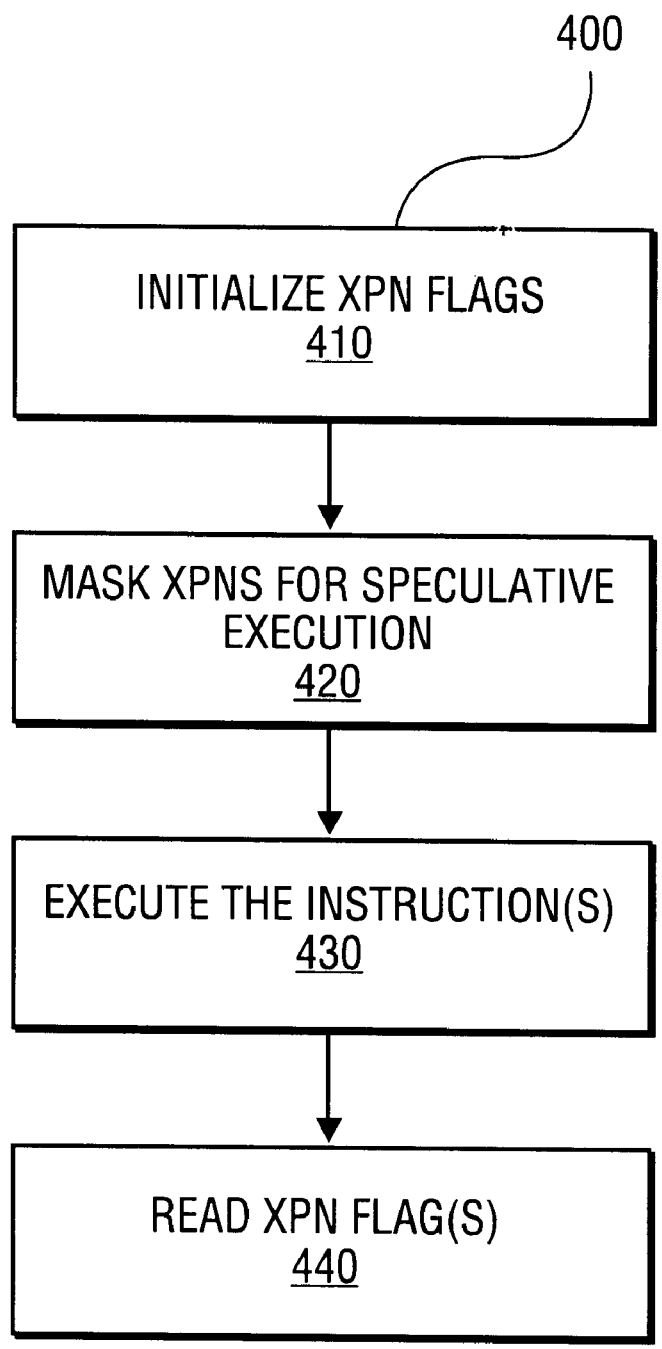
FIG. 4 is a flow chart representing a method in accordance with the present invention for detecting an unmasked underflow exception for speculatively executed floating-point instructions.

FIG. 4 is an overview of a method 400 for detecting unmasked underflow exceptions in accordance with the present invention. The status flags are initialized 410 for the instruction(s) to be executed. For one embodiment of the invention, this may be accomplished by a Clear_Flags instruction, which sets all status flags to the state indicating that no exceptional condition has been detected. For the embodiment of status flags represented by table 4, the status flags V, D, Z, O, U, I and T are set to zero. The exceptions are then masked 420 so that the speculatively executed instruction(s) does not redirect the processor if an exception is detected in the result(s) generated by the instruction(s). For one embodiment of the invention, this may be accomplished by setting mask bits 112 in the trap field 110 to mask their corresponding exceptions. Alternatively, mask bit TD in control field 210 may be set. no mask bit is provided for exception flag T since its state is not used to trigger an exception handler.

The instruction(s) is then executed 430 and the status flags are read to determine whether any exceptions have been detected for the speculatively executed instructions. The state of exception flag T indicates whether an unmasked underflow exception occurred, despite the fact that the instruction(s) was executed with the underflow exception masked.

A pseudo-code representation of method 400 for speculatively executing a series of floating-point instructions is indicated below.

Clear_Flags (clear exception flags, including T)
    Set_FPSR (initialize FPSR mode, mask bits)
    FP1 (execute $1^{st}$ FP instruction using $1^{st}$ status field)
    FP2 (execute $2^{nd}$ FP instruction using $2^{nd}$ status field)
    FPn (execute $n^{th}$ FP instruction using $n^{th}$ status field)
    Read_Flags (read exception flags, including T, to ID exceptional results)

There has thus been provided a method for detecting unmasked underflow exceptions for speculatively executed instructions. The method employs an exception status flag that may be set by the floating-point hardware when a result generated by an instruction is "tiny". All exception status flags are cleared and, for speculatively executed instructions, all exceptions, including the underflow exception, are masked. The instruction(s) is executed and the "tiny" exception status flag is read to determine whether the result(s) generated an unmasked underflow exception.

The invention has been illustrated using the IEEE 745 standard and a particular status register structure to more fully illustrate its features. Persons skilled in the art will recognize that the method may be implemented with a variety of modifications that none the less fall within the spirit of the invention. For example, the "tiny" status flag need not be included in a floating-point status register. Further, the invention may be applied to other standards that define exception conditions differently, depending on whether the exception is masked or unmasked. The invention is limited only by the scope of the appended claims.

What is claimed is:

1. A method for detecting underflow comprising:
   clearing a first status flag, the first status flag to indicate whether a result is too small to be represented in a specified format;
   masking an underflow exception status flag;
   executing a floating-point instruction;
   reading the first status flag to determine whether the floating-point instruction should raise an unmasked underflow exception.

2. The method of claim 1, wherein masking an underflow exception flag comprises setting a mask bit associated with the underflow exception status flag.

3. The method of claim 1, wherein clearing the first status flag comprises executing a clear status flags instruction.

4. The method of claim 1, further comprising:
   storing an indicator if an unmasked underflow exception should be raised; and
   reading the indicator and jumping to an exception handler if a point of registration associated with the floating-point instruction is reached.

5. The method of claim 2, wherein a result that is too small to be represented in a specified format is "tiny" and the first flag is set if the result is "tiny".

6. The method of claim 5, wherein the masked underflow exception status flag is set only if the result is both "tiny" and "inexact".

7. A method for detecting an underflow exception comprising:
   executing a floating-point instruction;
   setting a first status flag if a result generated by the executed instruction is less than a specified minimum value;
   setting a second status flag if the result is both less than a specified minimum value and inexact; and
   reading the first status flag to detect an underflow exception, if the instruction is executed speculatively.

8. The method of claim 7, wherein masking the underflow exception comprises executing a flag clearing instruction.

9. The method of claim 7, further comprising indicating an underflow exception if a point of registration for the instruction is reached, the instruction is speculative, and the first status flag is set.

10. A machine readable medium that stores instructions which may be executed by a processor to implement a method for detecting an underflow condition comprising:
    masking exceptions for a floating-point instruction;
    executing the floating-point instruction;
    setting a first status flag if a result generated by the executed instruction is tiny; and
    setting a second status flag if the result is both tiny and inexact.

11. The machine readable medium of claim 10, further comprising reading the first status flag and raising an underflow exception if a point of registration for the instruction is reached and the first status flag is set.

12. The method of claim 10, wherein masking exceptions comprises clearing status flags associated with the floating-point instructions.

13. The method of claim 12, wherein the status flags include exception status flags as well as the status flag that is set to indicate whether a result is tiny.

14. A computer system comprising:
    a processor having a floating-point status register, the floating-point status register including a "tiny" status flag and an underflow status flag; and
    a memory to store an instruction sequence which may be implemented by the processor to clear the tiny and underflow status flags, mask the underflow status flag, calculate a floating-point result; and set the tiny status flag if the floating-point result is tiny.

15. The system of claim 14, wherein the instruction sequence causes the processor to raise the underflow exception if the tiny status flag is set and a point of registration associated with the floating-point calculation is reached.

16. The system of claim 14, wherein the floating-point status register includes a mask bit which may be set to mask the underflow status flag.

17. The system of claim 15, wherein the instruction sequence causes the processor to mask the underflow flag if a floating point instruction is executed speculatively.

18. A method comprising:
 clearing a first status flag, the first status flag to indicate if a result generated by an instruction is less than a minimum value in a specified format;
 clearing a second status flag, the second status flag to indicate if the result raises an underflow exception;
 executing the instruction; and
 if the instruction is executed speculatively, checking the first status flag to determine if an underflow exception should be raised.

19. The method of claim 18, further comprising raising an underflow exception if a point of registration for the instruction is reached and the first status flag is set.

20. The method of claim 18, further comprising checking the second status flag to determine if an underflow exception should be raised if the instruction is not executed speculatively.

21. The method of claim 20, further comprising setting a masking bit associated with the second status flag if the instruction is executed speculatively.

* * * * *